United States Patent Office 3,081,193
Patented Mar. 12, 1963

3,081,193
PROCESS FOR THE TREATMENT OF
POLYAMIDE FABRICS
Alex Charles Stasse, Mornimont, Belgium, assignor to
UCB (Union Chimique-Chemische Bedrijven) S.A.
Brussels, Belgium, a corporation of Belgium
No Drawing. Filed Jan. 12, 1961, Ser. No. 82,178
Claims priority, application Belgium Jan. 21, 1960
7 Claims. (Cl. 117—68)

This invention relates to a process for the treatment of polyamide fabrics such as nylon and Perlon.

Fabrics manufactured with these synthetic materials may be rendered water-repellent according to the process of the invention.

The use of aqueous emulsions in lieu of organic solutions is very advantageous with respect to security (poisoning and fire dangers) and manufacturing cost (evaporation of the solvents, special equipment).

The process of the invention comprises a treatment with two emulsions containing acrylic polymers, a polymerized unsaturated acid at least partially neutralized by ammonia, thermosetting resins and polysiloxane resins.

According to one of the embodiments of the invention, the first emulsion applied on a side of the fabric contains:
  At least one acrylic or methacrylic polymer;
  Polyacrylic or polymethacrylic acid at least partially neutralized with ammonia;
  At least one thermosetting resin.

The fabric is then dipped in the second emulsion containing at least one polysiloxane resin.

The first emulsion contains from 10 to 50% of dry matter, i.e.:
  From 94 to 98 parts of acrylic polyesters selected from the group consisting of lower alcohol polyacrylates and polymethacrylates, and their copolymers with vinyl acetate or styrene;
  From 0.1 to 2 parts of polyacrylic or polymethacrylic acid from which 30 to 100% are neutralized by ammonia;
  From 1 to 5 parts of thermosetting resins selected from the group consisting of urea-formaldehyde, melamine-formaldehyde, dimethylolethylene-urea and triazone resins.

After the application of the acrylic polymers emulsion, the fabric is dried and the resins are polymerized by heating at a temperature of at least 50° C. The polymerization time decreases as the temperature increases. However, a heating at a temperature which causes the deterioration of the fabric must be avoided.

It has been found that it is advantageous to apply several layers of the acrylic polymers emulsion. Each application is immediately followed by a drying and a curing of the resins.

When several layers are applied, the composition of the last acrylic polymers emulsion may be slightly modified by adding from 1 to 3% of a finely divided substance such as colloidal silica or titanium dioxide.

The polyacrylic (or polymethacrylic) acid and the acrylic (or methacrylic) esters are sometimes copolymerized with said thermosetting resins. In this case, the first emulsion applied contains a copolymer with the following composition:
  From 65 to 96 parts of a lower alcohol polyacrylate;
  From 1 to 15 parts of polyacrylic or polymethacrylic acid neutralized by ammonia;
  From 3 to 20 parts of a thermosetting resin selected from the group consisting of dimethylolethylene-urea, melamine-formaldehyde and triazone resins.

The weight of acrylic polymers applied ranges from 10 to 100 g. per square meter.

The second emulsion applied contains from 1 to 10% of dry matter, i.e.:

From 80 to 98% of at least one polysiloxane resin having the general formula

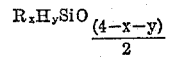

wherein
R represents an alkyl, aryl or aralkyl radical;
$x$ a number from 1 to 2;
$y$ a number from 0 to 2;
$x+y$ ranges from 1.2 to 2.2.

From 2 to 20% of a polymerization catalyst selected from the group consisting of zinc, tin, zirconium and titanium salts of fatty acids and other organic derivatives of these metals.

After dipping in the polysiloxanes emulsion, the fabric is squeezed and then heated at a temperature of at least 60° C. during a time which varies with the temperature and which generally ranges from 30 seconds to 10 minutes.

The total quantity of dry matter applied during the treatment with both emulsions ranges from 15 to 150 g. per square meter.

According to another embodiment of the invention, the first emulsion applied on a side of the fabric contains:
  At least one acrylic or methacrylic polyester,
  Polyacrylic or polymethacrylic acid at least partially neutralized by ammonia.

The fabric is then dipped in an emulsion containing:
  At least one polysiloxane resin;
  At least one thermosetting resin;
  Polyacrylic or polymethacrylic acid at least partially neutralized by ammonia.

The first applied emulsion contains from 20 to 50% of dry matter, i.e.:
  From 95 to 99.7 parts of acrylic polyesters selected from the group consisting of lower alchols polyacrylates and polymethacrylates and their copolymers with vinyl acetate or styrene;
  From 0.3 to 5 parts of polyacrylic or polymethacrylic acid from which 30 to 100% are neutralized by ammonia.

After the appilcation of this emulsion, the fabric is dried and the resins are polymerized by heating at a temperature of at least 50° C.

This application may be repeated as above described.

The fabric is then dipped in a second emulsion containing from 3 to 10% of dry matter, i.e.:
  From 38 to 58 parts of at least one polysiloxane resin having the general formula

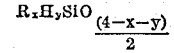

wherein R, $x$ and $y$ have the same meaning as above.
  From 2 to 20 parts of a polymerization catalyst as already disclosed;
  From 30 to 40 parts of a thermosetting resin selected from the group consisting of urea-formaldehyde, melamine-formaldehyde, dimethylolethylene urea and triazone resins;
  From 0.1 to 0.5 part of polyacrylic acid neutralized by ammonia.

After dipping in this emulsion, the fabric is squeezed and then heated at a temperature of at least 60° C. during a time which varies with the temperature and which generally ranges from 30 seconds to 15 minutes.

The total quantity of dry matter applied during the treatment with both emulsions ranges from 15 to 150 g. per square meter.

0.1 to 4% (dry basis) of an emulsifying agent are added to all the emulsions used in both embodiments. The emulsions eventually contain a wetting agent, a stabilizer or a softener. It may be advantageous to add in one of the emulsions, products improving the properties of the fabrics: matting agents, colored pigments, etc.

The nature of the emulsifying agents and of the other agents which may be added to the emulsions is not critical.

The coatings obtained according to the invention are transparent, light-, cold- and heat-unalterable. Their adhesion to the fabrics is good. Their wear and tear are very slow. Besides, the invention coatings have the advantage of withstanding the action of water and of detergent solutions. This resistance to washing is proved by treating a polyamide fabric in a Launder-Ometer (Proc. Am. Assoc. Textile Chem. Colorists, 1928, pp. 265–68).

The water-repellent effect obtained with the treatment of the invention is determined in the examples using a spray tester or a Schmerber apparatus.

The spray tester is described in the Standard A.S.T.M. D583. The fabric is sprinkled with a water current in standard conditions. According to the surface state, the water-repellent effect is determined by a number ranging from 100 (substantially complete water-repellent effect) to 0 (no water-repellent effect).

The procedure with the Schmerber apparatus is as follows. The fabric is submitted to a determined water-pressure. If no visible wetting is observed after two hours, the water-pressure is increased in order to determine the highest water-pressure which may be applied during two hours without wetting the fabric. In the examples, the highest pressure corresponding to the apparatus of my laboratory is 400 mm.

The following examples are illustrative of the invention. The quantities of matter applied, the temperatures and duratons and also the equipment do not limit the invention.

*Example 1*

A previously fixed and dyed nylon fabric is washed in a detergent solution to remove any traces of oiling and of dye which has not been fixed.

The fabric is coated on one side by means of an emulsion containing 40% of dry matter, i.e.:

95.5 parts of ethyl polyacrylate;
0.5 parts of polyacrylic acid from which 60% are neutralized by ammonia;
3 parts of a melamine-formaldehyde resin;
1 part of an emulsifying agent.

The fabric is immediately placed in an oven heated at 140–150° C. where it remains during 3 minutes. It is then cooled in an air stream.

A second coating is applied under the same conditions.

To apply the third coating, an emulsion is used containing 40% of dry matter, i.e.:

94.5 parts of a copolymer of ethyl acrylate and methyl methacrylate;
0.5 part of polyacrylic acid from which 50% are neutralized by ammonia;
3 parts of a melamine-formaldehyde resin;
1 part of colloidal silica;
1 part of an emulsifying agent.

The drying and polymerization are carried out as described above.

The weight of dry matter applied on the coated side of the fabric is equal to 15 g. per square meter corresponding to a thickness of 13 microns.

For the application of the second emulsion, the fabric is dipped in a bath containing 4% of dry matter, i.e.:

36.5 parts of a methyl hydrogen polysiloxane ($CH_3:Si=1$; $H:Si=1$);
50 parts of a methyl polysiloxane ($CH_3:Si=2$);
10.5 parts of an emulsion of an organotin compound;
3 parts of an emulsifying agent.

The fabric is squeezed and thereafter placed in an oven heated at 150° C. during 3.5 minutes.

The water-repellent effect determined with the spray tester is 100.

The fabric submitted to a water pressure of 400 mm. resists perfectly for over two hours.

The washing has been carried out in a Launder-Ometer under the following conditions.
Duration: 90 minutes;
Temperature: 60° C.;
Solution containing 5 g. of Castile soap in one liter of distilled water.

After drying, the appearance of the fabric is unchanged. The water-repellent effect determined with the spray tester is 100. The fabric resists perfectly to a water pressure of 350 mm. for over two hours.

*Example 2*

The fabric is coated on one side by means of an emulsion containing 40% of dry matter, i.e.:

98.5 parts of ethyl polyacrylate;
0.5 part of polyacrylic acid from which 60% are neutralized by ammonia;
1 part of an emulsifying agent.

The fabric is immediately placed in an oven heated at 140–150° C. where it remains during 3 minutes. It is then cooled in an air stream.

A second coating is applied under the same conditions.

To apply the third coating an emulsion is used containing 40% of dry matter, i.e.:

97.5 parts of a copolymer of ethyl acrylate and methyl methacrylate;
0.5 part of polyacrylic acid from which 50% are neutralized by ammonia;
1 part of colloidal silica;
1 part of an emulsifying agent.

The drying is carried out as described above.

The quantity of dry matter applied on the coated side of the fabric is equal to 15 g. per square meter corresponding to a thickness of 13 microns.

For the application of the second emulsion, the fabric is dipped in a bath containing 6% of dry matter, i.e.:

0.5 part of polyacrylic acid neutralized by ammonia;
38 parts of dimethylolethylene-urea resin;
22 parts of a methyl hydrogen polysiloxane ($CH_3:Si=1$; $H:Si=1$);
29.5 parts of a methyl polysiloxane ($CH_3:Si=2$);
7 parts of catalyst constituted by an emulsion of an organotin compound;
3 parts of an emulsifying agent.

The squeezed fabric is placed in an oven heated at 150° C. during 3.5 minutes.

The water-repellent effect determined with the spray tester is 100.

*Example 3*

The fabric is coated on one side by means of an emulsion containing 40% of a polymer prepared from:

81.5 parts of ethyl polyacrylate;
10 parts of a dimethylolethylene-urea resin;
7.5 parts of polyacrylic acid neutralized by ammonia;
1 part of an emulsifying agent is added thereto.

The fabric is immediately placed in an oven heated at 140–150° C. where it remains during 3 minutes. It is then cooled in an air stream.

A second coating and a third one are applied under the same conditions.

The weight of dry matter applied on the coated side of the fabric is equal to 15 g. per square meter corresponding to a thickness of 13 microns.

For the application of the second emulsion, the fabric is dipped in a bath containing 4% of dry matter, i.e.:

40 parts of a methyl hydrogen polysiloxane ($CH_3:Si=1$; $H:Si=1$);

55 parts of a methyl polysiloxane (CH$_3$:Si=2);
2 parts of an emulsion of an organotin compound;
3 parts of an emulsifying agent.

The squeezed fabric is placed in an oven heated at 150° C. during 3.5 minutes.

The water-repellent effect determined with the spray tester is 100.

The fabric submitted to a water pressure of 400 mm. resists perfectly for nearly 2 hours. This water-proofing remains unchanged after washing in a Launder-Ometer carried out under the following conditions.

Duration: 30 minutes;
Temperature: 60° C.;
Solution containing 5 g. of Castile soap in one liter of distilled water.

The results are the same after a scouring of a few minutes in a solvent such as white spirit or trichlorethylene, followed by centrifuging and drying.

I claim:

1. A process for rendering polyamide fabrics water-repellent, which comprises applying on a side of the fabrics several layers of a first emulsion containing from 10 to 50% of dry matter, consisting essentially of (a) from 94 to 98% of acrylic polymers, (b) from 0.1 to 2% of a polyacrylic acid at least partially neutralized with ammonia, and (c) from 0 to 5% of thermosetting resins, each application being followed by a drying and a heating at a temperature of at least 50° C., and thereafter dipping the fabrics in a second emulsion containing from 1 to 10% of dry matter, consisting essentially of (a) from 80 to 98% of at least one polysiloxane resin having the general formula $$R_xH_ySiO_{\frac{(4-x-y)}{2}}$$

wherein

R represents a number selected from the group consisting of alkyl, aryl and aralkyl radicals;
x a number from 1 to 2;
y a number from 0 to 2;
x+y ranging from 1.2 to 2.2;

(b) from 2 to 20% of polymerization catalyst, (c) from 0 to 5% of thermosetting resins and (d) from 0 to 3% of polyacrylic acid neutralized by ammonia, one of both emulsions containing thermosetting resins, the dipping in the polysiloxanes emulsion being followed by a squeezing, a drying and a heating at a temperature of at least 60° C.; the total quantity of dry matter applied during the treatment with both emulsions ranging from 15 to 150 g. per square meter of fabric.

2. Water-repellent polyamide fabrics obtained by treating said fabrics by the process of claim 1.

3. A process for rendering polyamide fabrics water-repellent, which comprises applying on a side of the fabrics several layers of a first emulsion containing from 10 to 50% of dry matter, consisting essentially of from (a) 94 to 98% of acrylic polyesters selected from the group consisting of lower alcohol polyacrylates and polymethacrylates and their copolymers with vinyl acetate and styrene, (b) from 0.1 to 2% of a polymerized unsaturated acid selected from the group consisting of polyacrylic and polymethacrylic acids from which 30 to 100% are neutralized by ammonia, and (c) from 1 to 5% of thermosetting resins, each application being followed by a drying and a heating at a temperature of at least 50° C. and thereafter dipping the fabrics in a second emulsion containing from 1 to 10% of dry matter, consisting essentially of (a) from 80 to 98% of at least one polysiloxane resin having the general formula $$R_xH_ySiO_{\frac{(4-x-y)}{2}}$$

wherein

R represents a member selected from the group consisting of alkyl, aryl and aralkyl radicals;
x a number from 1 to 2;
y a number from 0 to 2;
x+y ranging from 1.2 to 2.2;

and (b) from 2 to 20% of a polymerization catalyst, the dipping in the polysiloxanes emulsion being followed by a squeezing, a drying and a heating at a temperature of at least 60° C.; the total quantity of dry matter applied during the treatment with both emulsions ranging from 15 to 150 g. per square meter of fabric.

4. A process for rendering polyamide fabrics water-repellent, which comprises applying on a side of the fabrics several layers of a first emulsion containing a copolymer prepared from (a) 65 to 96 parts of a lower alcohol polyacrylate; (b) 1 to 15 parts of a polymerized unsaturated acid selected from the group consisting of polyacrylic and polymethacrylic acids neutralized by ammonia, and (c) 3 to 20 parts of thermosetting resins, each application being followed by a drying and a heating at a temperature of at least 50° C., and thereafter dipping the fabrics in a second emulsion containing from 1 to 10% of dry matter consisting essentially of 80 to 98% of at least one polysiloxane resin having the general formula $$R_xH_ySiO_{\frac{(4-x-y)}{2}}$$

wherein

R represents a member selected from the group consisting of alkyl, aryl and aralkyl radicals;
x a number from 1 to 2;
y a number from 0 to 2;
x+y ranging from 1.2 to 2.2;

and from 2 to 20% of a polymerization catalyst, the dipping in the polysiloxanes emulsion being followed by a squeezing, drying and heating at a temperature of at least 60° C.; the total quantity of dry matter applied during the treatment with both emulsions ranging from 15 to 150 g. per square meter of fabric.

5. A process for rendering fabrics water-repellent, which comprises applying on a side of the fabrics several layers of a first emulsion containing from 10 to 50% of dry matter, consisting essentially of (a) from 95 to 99.7% of acrylic polyesters selected from the group consisting of lower alcohol polyacrylates and polymethacrylates and their copolymers with vinyl acetate and styrene, (b) from 0.3 to 5% of a polymerized unsaturated acid selected from the group consisting of polyacrylic and polymethacrylic acids from which 30 to 100% are neutralized by ammonia, each application being followed by a drying and a heating at a temperature of at least 50° C., and thereafter dipping the fabrics in a second emulsion containing from 1 to 10% of dry matter, consisting essentially of (a) from 38 to 58% of at least one polysiloxane resin having the formula $$R_xH_ySiO_{\frac{(4-x-y)}{2}}$$

wherein

R represents a member selected from the group consisting of alkyl, aryl and aralkyl radicals;
x a number from 1 to 2;
y a number from 0 to 2;
x+y ranging from 1.2 to 2.2;

(b) from 2 to 20% of a polymerization catalyst, (c) from 30 to 40% of a thermosetting resin, and (d) from 0.1 to 0.5% of polyacrylic acid neutralized by ammonia, the dipping in the polysiloxanes emulsion being followed by a squeezing, drying and heating at a temperature of at least 60° C.; the total quantity of dry matter applied during the treatment with both emulsions ranging from 15 to 150 g. per square meter of fabric.

6. Process for rendering polyamide fabrics water-repellent which comprises
(1) coating one side of the fabrics with at least one layer of a first emulsion consisting essentially of
   (a) 65 to 96 parts by weight of acrylic polymers selected from the group consisting of lower alcohol polyacrylate, polymethacrylate, copolymer of polymethacrylate with vinyl acetate and copolymer of polymethacrylate with styrene, and
   (b) 1 to 15 parts by weight polymerized unsaturated acid selected from the group consisting of polyacrylic acid and polymethacrylic acid, said acid being partially neutralized with ammonia,
(2) dipping the resultant fabric in an emulsion consisting essentially of
   (a) polymerization catalyst, and
   (b) at least one polysiloxane having the formula

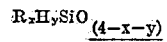

where R is a member selected from the group consisting of alkyl, aryl and aralkyl, $x$ is a number from 1 to 2, $y$ is a number from 0 to 2 and $x+y$ ranges from 1.2 to 2.2, and
(3) adding to at least one of the emulsions in (1) and (2), prior to contacting with said fabric, thermosetting resin, the total quantity of dry matter applied during treatment with both emulsions of (1) and (2) ranging from 15 to 150 grams per square meter of fabric, and
(4) heating the resultant coated fabric to effect curing.

7. Water-repellent polyamide fabrics obtained by treating said fabrics with the emulsions as claimed in claim 6.

References Cited in the file of this patent
UNITED STATES PATENTS

| | | |
|---|---|---|
| 2,588,366 | Dennett | Mar. 11, 1952 |
| 2,662,039 | Brown et al. | Dec. 8, 1953 |
| 2,731,367 | Caroselli | Jan. 17, 1956 |
| 2,750,305 | Gagarine | June 12, 1956 |
| 2,802,754 | Ashby | Aug. 13, 1957 |
| 2,807,601 | Dennett | Sept. 24, 1957 |
| 2,982,674 | Ganchberg | May 2, 1961 |